United States Patent [19]

Bogart

[11] 3,795,485
[45] Mar. 5, 1974

[54] SYNTHESIS GAS GENERATION APPARATUS
[75] Inventor: Marcel J. P. Bogart, Whittier, Calif.
[73] Assignee: Fluor Corporation, Los Angeles, Calif.
[22] Filed: June 28, 1971
[21] Appl. No.: 157,452

[52] U.S. Cl................. 23/262, 423/656, 23/288 K, 23/289, 260/449.5, 252/373, 48/197
[51] Int. Cl............................................. B01j 9/04
[58] Field of Search.. 23/260, 212 A, 212 R, 288 K, 23/289; 252/376; 48/196, 197; 423/656

[56] References Cited
UNITED STATES PATENTS
| | | | |
|---|---|---|---|
| 2,443,773 | 6/1948 | Matuszak | 23/288 K |
| 3,012,962 | 12/1961 | Dygert | 23/260 X |
| 3,446,747 | 5/1969 | Bongiorno | 23/212 A X |

Primary Examiner—James H. Tayman, Jr.
Attorney, Agent, or Firm—Louis J. Bachand

[57] ABSTRACT

Apparatus for generating high pressure synthesis gas containing hydrogen and carbon oxides and useful in Oxo processes, hydrogen production, and in the production of ammonia, methanol and the like. The apparatus includes a furnace, a novel arrangement of a combustion turbine exhausting into the furnace to supply preheated oxygen thereto and a sequence of heaters and reactors for alternately heating the reaction mixture in the furnace and adiabatically reacting the mixture outside the furnace to enable reaction and thus gas product at higher pressures than previously obtained. The mentioned heater-reactor sequence minimizes waste heat in the furnace and makes its recovery, e.g. as steam, no longer of such major economic importance to the process, enabling use of a combustion turbine both to supply preheated oxygen to the furnace and to drive plant machinery such as compressors for air to be fed to the secondary reformer in ammonia synthesis gas production.

1 Claim, 1 Drawing Figure

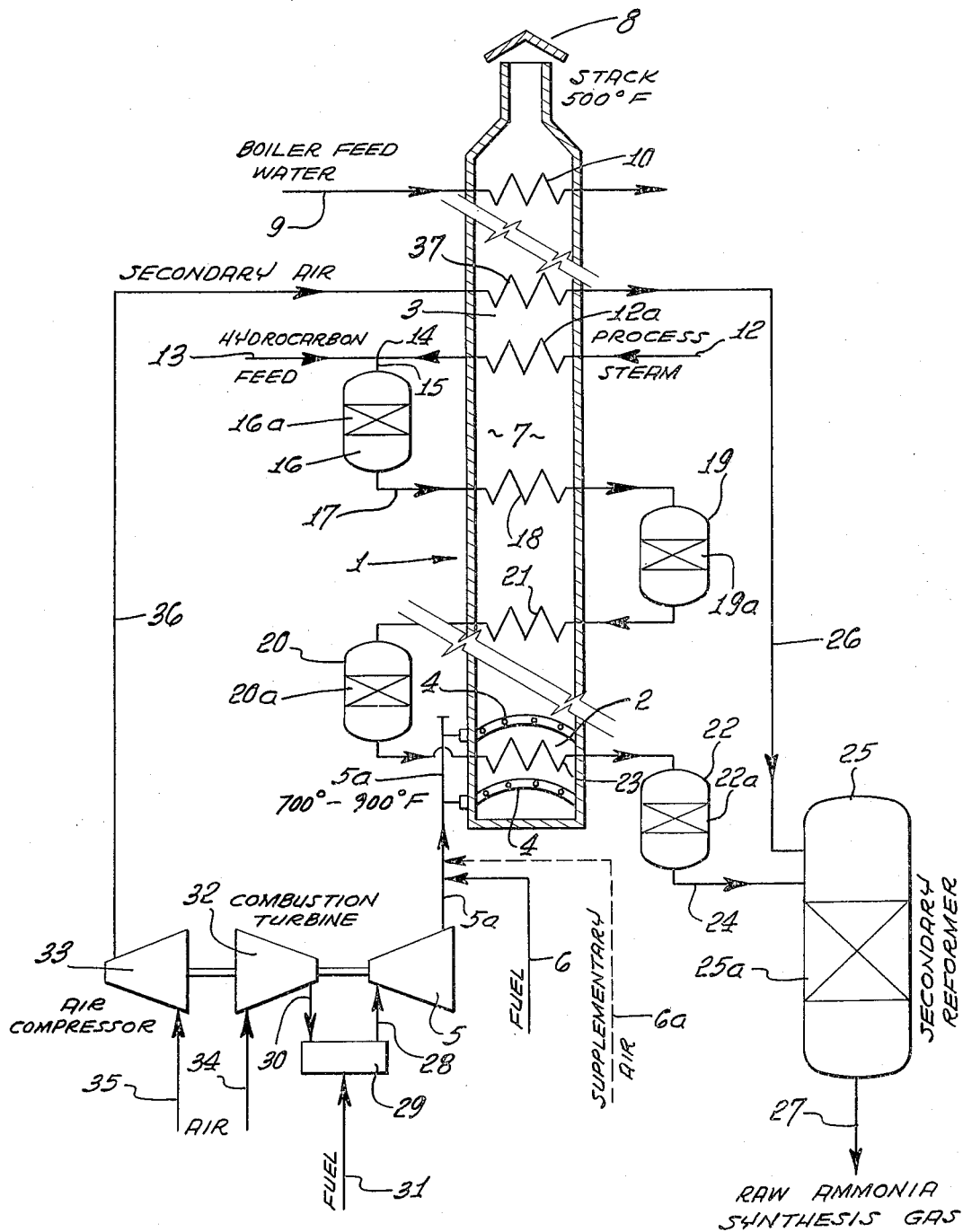

SYNTHESIS GAS GENERATION APPARATUS

BACKGROUND OF THE INVENTION

This invention has to do with apparatus for synthesis gas generation and, more particularly, is concerned with apparatus enabling the obtainment of synthesis gas at higher pressures than heretofore, with increased heat utilization efficiencies and at lower overall cost.

Synthesis gas is a term applied to raw material gas streams containing hydrogen and carbon oxides which may be converted, "synthesized", into products for which there is considerable commercial demand, e.g. methanol, hydrogen, ammonia and Oxo process products. A basic route to suitable synthesis gases is the steam reforming of hydrocarbon vapors which form a readily available and low cost source of hydrogen and carbon. In steam reforming, a reaction mixture of steam and hydrocarbon vapor, ranging from methane to naphtha and higher molecular weight hydrocarbons, is contacted at high temperatures, 1000°F and above, and at elevated pressures, with a suitable catalyst. The catalytic reaction with the steam converts the hydrocarbon raw material into hydrogen and carbon oxides. The basic reactions taking place include:

1. $CH_4 + H_2O \xrightarrow{cat} CO + 3 H_2$ for methane, and 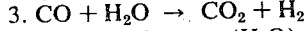
2. $C_6H_{14} + 6 H_2O \xrightarrow{cat} 6 CO + 13 H_2$ for hexane, and similarly for other hydrocarbon vapors. The CO and $H_2O$ may react to form $CO_2$ and additional $H_2$ by the so-called water-gas shift reaction
3. $CO + H_2O \rightarrow CO_2 + H_2$ An excess of steam ($H_2O$), over the stoichiometric amount indicated in the equations (1) and (2) above, is typically employed to force the equilibrium in the reforming reactions toward the right hand side of equations (1) and (2). Such stoichiometric excess of steam will also maximize conversion of carbon monoxide by the shift reaction, equation (3). Should a deficiency in CO thus develop, e.g. for a synthesis gas to be used in methanol production according to the equation 4. $CO + 2 H_2 \rightarrow CH_3OH$ 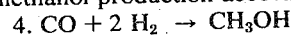

there may be added $CO_2$ to the reaction mixture for the generation in the reforming process of CO, as by overall equation 5. $CO_2 + 3 CH_4 + 2 H_2O \rightarrow 4 (CO + 2H_2)$ 

In producing the above-mentioned commercially important products and others, the generated synthesis gas leaving the steam reforming process is subjected to further treatments, e.g. equation (4) above. Such treatments frequently desirably or necessarily involve the use of quite high pressure, e.g. 500 psig and even considerably higher pressures in the range of 1500 psig to 10,000 psig.

Raw synthesis gas obtained from the reformer at lower pressures thus must be compressed to desirable further treatment pressures necessitating high energy costs and capital expense for the compression. PRIOR ART.

To my knowledge, synthesis gases containing hydrogen and carbon oxides at higher pressures than 400–500 psig are not economically obtainable in heretofore known steam reformers. The limitation on pressures obtainable is inherent in the design of presently known catalytic reforming reactors, given the present state of construction material development.

In presently used steam reforming apparatus, a plurality of catalyst filled tubes, vertically disposed within a furnace, are used as the reaction zone. The tubes are located specifically inside the firebox or radiant heating section of the furnace and are there subjected to radiant heat from a surrounding multiplicity of burners burning a suitable fuel and arranged to give a high uniformity of heat distribution. The catalyst containing tubes necessarily are formed of high heat resistant alloy material. These tubes may be 20 to 40 feet in length, have inside diameters of 3 to 5 inches, and a wall thickness of 0.5 to 0.75 inch and more. The tubes are filled throughout their length with reforming catalyst of well known and conventional composition, typically in the form of hollow cylinders 0.37 inch in the outside diameter and 0.37 inch in length. Being located in the radiant heating section of the furnace, these catalyst containing tubes are heated to a substantial temperature by the burner flames. For example, in generation of an ammonia synthesis gas, a steam-hydrocarbon vapor mixture preheated to e.g. 900°F enters the catalyst tubes and must be heated to over 1400°F in the course of passage through the tubes requiring the furnace combustion gases to reach temperatures of 1900°F and more.

The catalyst containing tubes are subject to maximum heat stress at their outer wall near the bottom of the firebox. Temperatures on the outer tube skin will likely be 150°F to 200°F higher than the exit temperature of the treated reaction mixture, e.g. 1600°F and higher. Such temperatures are in the critical region for the tube metal, where the allowable design stress of the alloys available drops off sharply. For example, a 304 stainless alloy undergoes a loss of strength from 2,500 psi at 1600°F to 1,200 psi at 1800°F and to only 500 psi at 2000°F.

The suitable wall thickness of a catalyst containing tube for a reformer is given by the formula $$t = PD/fS$$

wherein P is the operating pressure, D, the tube diameter, S, the allowable stress and $f$, a design safety factor. The economical upper limit of wall thickness for reformer tubes is about one inch. The typical tube dimensions and maximum heated gas temperature mentioned above combine to limit the allowable internal gas pressure within these tubes to about 500 psig for presently commercially employed and foreseeable alloys.

Modifications of tube design such as reduction of diameter D could raise the allowable pressure limit without an increase in wall thickness, $t$. Because the tube is used to contain a catalyst bed, fluid flow and heat and mass transfer characteristics are significant and a reduced tube diameter would necessitate a corresponding decrease in catalyst particle size. The use of smaller catalyst pellets would, however, require a reduction in reaction mixture velocity through the tubes to keep the gas pressure drop through the tube at an acceptably low level. This change would require a markedly increased number of tubular elements at greatly increased cost for the radiant section of the reformer.

Moreover, the increase in gas volume as reactions (1) and (2) proceed requires raising of the final temperature as the operating pressure goes up to maintain levels of unconverted hydrocarbon, "methane leak", reasonably constant and near the thermodynamic equilibrium value. According to the above tube wall thickness formula, the tube wall thickness could be cumulatively increased by the dual effect of the raised pressure and the further dropping of the already low value of allowable stress by the increase in operating temperature.

A further significant aspect of present reforming apparatus is undue waste in heat utilization. Reformer furnaces are highly specialized, expensive apparatus for supplying heat for the reforming reaction. Heat for the reforming reaction includes that necessary to preheat feed and to raise process steam as well as heat supplied to the reactants as the reforming reactions proceed. It is obviously undesirable to use the reformer to supply heat other than that required for reforming, since such auxiliary heat can generally be supplied more economically by other means. As noted above, in previously known reformers, the burner tubes are located in the firebox or radiant heating section of the furnace. Combustion gases used to heat the reactor tubes leave the radiant section of the furnace at temperatures above 1900°F, i.e. with tremendous heat contents most of which are not useable to further the reforming reaction. Cooling these flue gases to say 500°F or less for the sake of economic heat utilization before venting them to the atmosphere will provide a quantity of surplus heat approximately as great as all the heat used to effect the reforming reaction. Thus the minimum fired duty for a known reformer furnace is nearly approximately double that duty required to satisfy the reforming reaction. Economy of operation dictates that a use must be found elsewhere in the process or plant for about one-half of the fired duty of the conventional reformer furnace; such uses include preheating air for the secondary reformer, if used and generation and superheating of process and motive steam. Obviously, an apparatus enabling a closer tailoring of furnace fired duty to reforming reaction requirements could mean significant fuel savings over conventional apparatus.

SUMMARY OF THE INVENTION

It is a major objective of the present invention to provide apparatus for obtaining high pressure synthesis gas from a conventional reformer reaction mixture by satisfying the high endothermic heat requirements in a novel manner including feeding preheated oxygen to the furnace from a combustion turbine, using the turbine mechanical energy output as needed in the plant or elsewhere, and freeing the catalyst containing vessel from exposure to firebox level temperatures while retaining high reaction mixture temperatures needed for efficient conversion of the reaction mixture into synthesis gas.

It is a further objective of the invention to have the fired duty of the furnace more closely approximate reforming reaction heat requirements, whereby substantial fuel savings are realized.

Specifically there may be mentioned these advantages of the present invention process:

The generated synthesis gas is delivered at high pressures lowering compression requirements for further treatment operations;

The catalyst containing vessels are widely variable in design and in materials of fabrication;

The radiant heating and convection heating sections of the furnace are each used to advantage because the endothermic heat of reforming does not have to be transferred entirely within the radiant section of the furnace;

The catalyst beds may be tailored both chemically and physically, for maximum effect in particular reactions, in sequence, as the reaction mixture composition changes, or for specific effects;

Catalyst life may be improved by specific adaptation and its cost lowered initially and during operation;

Capital costs are reduced by the elimination of dual demands for simultaneously high pressure and very high temperature resistance in the reaction vessel.

Other objects will become apparent hereinafter.

The foregoing and other objects are realized with apparatus according to the invention for generating a synthesis gas including plural adiabatic reactors in series flow connection for progressively catalytically reforming a preheated mixture of steam and hydrocarbon vapor into hydrogen and carbon oxides, plural heaters sequenced with these reactors each to heat the mixture for adiabatic reforming in its succeeding reactor, a furnace supplying heat to the heaters, and combustion turbine means having a mechanical energy output, the turbine means being arranged to exhaust oxygen containing combustion gases into the furnace to supply preheated oxygen to the furnace either as the sole source of oxygen to the furnace or with supplemental air to the furnace. Specific features of the apparatus include in certain embodiments, means supplying fuel to the furnace for combustion with the preheated oxygen in a manner to generate, e.g. only about 110 percent (without use of secondary reformer) and in general not more than 125 percent of the heat required for the reforming reactions, means utilizing the mechanical energy output of the turbine means, a secondary reactor and means for supplying compressed gases such as air from an air supply means to the secondary reactor, optionally with preheating in air heating means within the furnace, including compressor means such as a centrifugal compressor driven by the mechanical energy output of the combustion turbine means.

In preferred embodiments, the apparatus furnace is longitudinally extended and has a firebox at one end. The plural heating means are distributed in spaced relation along at least a portion of the furnace interior length, at least one of the heating means being located within the firebox portion of the furnace. The plural reactors may then be located outside the furnace whereby the reaction mixture passes alternately into the heaters within the furnace and into reactors outside the furnace. The furnace interior may be downwardly temperature graded out from the firebox and successive heating means disposed progressively closer to the firebox whereby reaction mixture temperatures increase in successive reactors sequenced with the heating means.

The apparatus plural reactors may comprise an initial primary reactor, at least one intermediate primary reactor and a final primary reactor. The heating means in advance of the initial reactor may be arranged within the furnace to heat the initial reactor feed to a temperature above about 750°F, the heating means in advance of the intermediate reactor may be arranged within the furnace to heat the intermediate reactor feed to a temperature above about 900°F, and the heating means in advance of the final reactor may be arranged within the furnace to heat the final reactor feed to a temperature above about 1400°F. The apparatus may further include means maintaining the pressure within the reactors above about 700 psig.

BRIEF DESCRIPTION OF THE DRAWINGS

The invention will be described as to an illustrative embodiment in accordance with the attached drawing in which the single FIGURE is a depiction of one form of apparatus according to the invention.

DESCRIPTION OF THE PREFERRED EMBODIMENTS

In the present apparatus the heating and reacting stages essential to generation of synthesis gas containing carbon oxides and hydrogen from steam and hydrocarbon vapor are separated and the catalyst containing reactor vessels removed from the heating zone so that the high temperatures there present are not visited unduly upon the reactor vessels. The reaction is conducted adiabatically, i.e. without the input of heat into the reactor other than by preheating the feed to the reactor. This accordingly reduces substantially heat stresses in the reactor vessels, and thus enables wide variability in their design and most importantly frees the synthesis gas generation operation from artificial constraints on pressures usable, to enable obtaining of higher pressure synthesis gas. The preheating of the reactor feed gases may be done in small-diameter thin-wall tubes, reducing their outer skin temperature and allowing their operation at higher internal pressures.

With reference to the drawing an alternating arrangement of adiabatic reactors and heating coils is shown for carrying out the present invention. Furnace 1 is a longitudinally extended structure of suitable heat resistant material having a higher temperature, radiant heating firebox section 2 and a lower temperature, convection heating section 3. The furnace may be horizontally disposed as well. Burners 4 are located in lower furnace firebox section 2 for burning the combustible mixture introduced through lines 5a, 6 and sometimes 6a to the furnace burners. Primary oxygen to the firebox is provided along line 5a from expander 5 of the combustion turbine. Turbine exhaust generally containing about 17 percent oxygen by volume is fed along line 5a to burners 4 in the firebox 2. Supplementary oxygen may be fed to the burners 4 in firebox 2 from line 6a carrying supplementary air to the burners. Flue gases and other products of combustion and their associated heat contents travel upwardly through the furnace 1 to the convection section 3 so that the furnace interior 7 is at progressively lower heated condition upward along its length. The furnace 1 terminates in a conventional stack at 8.

A mixture of steam and hydrocarbon feed vapors is fed to the furnace for heating to desired temperatures and catalytic reaction in contact with catalytically effective amount of a suitable catalyst known per se for conversion of the steam and hydrocarbon vapor into carbon oxides and hydrogen.

The steam portion of the feed comprises superheated steam which may be obtained using the furnace heat or from some nearby process or other source. High pressure steam is passed along line 12 for preheating in coil 12a before being combined with hydrocarbon vapors entering the system through line 13, the steam from coil 12a being at suitable temperature and pressure for initiating the reforming reaction after being mixed with hydrocarbon vapors from line 13.

Thus, the hydrocarbon vapors in line 13 comprising methane, ethane, propane, butanes, pentanes, hexanes and the like up to naphthas or higher hydrocarbons, or any of these, and at a temperature of about 750°F and a pressure of 800 psig are mixed with the superheated (1000°F) steam at 700 psig from heater coil 12a in line 12 at 14. The thus formed reaction mixture is passed to the initial reaction zone along line 15. The initial reaction zone comprises a suitable vessel 16 of any desired shape and suitable material and containing a bed 16a of reforming catalyst.

The reforming reaction in reactor 16 and all other reactors shown is endothermic and accordingly the initial reaction zone effluent, containing the reaction mixture and carbon oxides and hydrogen in some finite amount depending on specific reaction conditions, is passed from the reactor 16 along line 17 at a reduced temperature, e.g. 920°F, and a somewhat lowered pressure owing to the pressure drop across the catalyst bed 16a.

The initial reactor 16 effluent in line 17 is passed through the furnace convection section 3 in heater coil 18 which raises the effluent temperature to about 1100°F for feeding to the intermediate reactors. In the illustrated embodiment, the intermediate reactors comprise a plurality of reactors, two being shown, i.e. reactors 19 and 20 having catalyst beds 19a and 20a respectively. As will be noted from the broken lines in the drawing, the number of intermediate reactors may be varied to provide as many successive reaction stages as desired or required to achieve the substantially complete exhaustion of hydrocarbon, e.g. less than 8 mol percent methane for ammonia synthesis gas and less than 2 mol percent methane for other synthesis, e.g. hydrogen, methanol and Oxo products. Typically between three and eight separate reactors will be used in an ammonia synthesis gas reformer apparatus according to the present invention. A separate heating coil is provided in advance of each reactor. Thus heater coil 18 precedes reactor 19 and heater coil 21 follows reactor 19 and precedes reactor 20. It will be noted that the several reactors 19-20 as well as initial reactor 16 and final reactor 22 containing catalyst bed 22a are arranged for series flow connection through heater coils 18, 21 and 23 with which they alternate and that the successive heater coils progressively approach the radiant heating firebox section 2 of the furnace 1 where burners 4 are located, i.e. they advance closer to the common heat source defined by the furnace radiant heat firebox section. Accordingly, the several heater coils impart progressively higher temperatures to the fluids passing therethrough as the successive heater coils move downward in location within the furnace 1. Typical temperature rises through the heater coils are from 920° to 1100°F through heater coil 18 and from 1490°F to 1600°F through heater coil 23 leading from intermediate reactor 20 to final reactor 22 whence the synthesis gas emerges in line 24 at typically 700 psig and 1530°F.

Where an ammonia synthesis gas is to be produced, the effluent from furnace 1 in line 24 is passed from primary reactors or reformers 15, 19, 20 and 22 to a secondary reactor, or secondary reformer 25, containing catalyst bed 25a. There nitrogen is added typically in the form of compressed air from line 26. The mixed gases from reactor 25 after processing to remove $CO_2$ and contaminants comprise essentially hydrogen and nitrogen which is passed along line 27 to an ammonia synthesis.

The combustion turbine used to supply preheated oxygen to the furnace 1 has mechanical energy output resulting from the combustion and expansion of a compressed fuel-air mixture entering the expander portion 5 of the turbine from line 28. The fuel-air mixture is made and burned at 29 with compressed air from line 30 and fuel from line 31.

The output shaft of turbine expander 5 is directly coupled to compressors 32 and 33, compressor 32 operating to compress air fed thereto along line 34 for mixture with fuel at 29 and compressor 33 operating to compress air fed thereto along line 35 for use in the secondary reactor 25. Compressed air from compressor 33 is passed along line 36, preheated in coil 37 and passed along line 26 into secondary reformer 25. The flue gas, after preheating secondary air in coil 37 of furnace 1, will be cooled to a temperature where its small remaining heat content allows it to be rejected to the atmosphere. Alternately the residual heat can be recovered by economizers such as for boiler feed water preheating, e.g. feed water in line 9 is passed through coil 10 in the upper end of furnace 1, thereafter venting the flue gas to the atmosphere through stack 8 at an economic temperature, e.g. 400°-500°F.

The compressor 33 thus serves the need of generating compressed gas such as compressed air in the overall process, making unnecessary the generation of great amounts of steam for this purpose in the convection section 3 of the furnace 1, which has been the previous practice. With the need for superheated motive steam reduced, the furnace duty which is in excess of that required for carrying out the essential reforming reactions and which is to be reclaimed by nonessential auxiliary consumers for maximizing the economy of operation, is lowered by from 75 to 90 percent. Thus whereas an auxiliary heating duty about equal to the reforming duty has been commonplace in reformer furnaces, i.e. overall heating duty equals 200 percent of reforming heating duty, in the present apparatus, the total heating duty is only 110–125 percent of the reforming heating duty, i.e. only 10–25 percent above the heating necessary to effect the reforming reaction. A savings in heat and thus fuel remains, also, after the fuel consumption of the combustion turbine is taken into consideration.

The advantage of using a combustion turbine (Case B) over steam driver turbines (Case A) for secondary air compression in an ammonia synthesis gas generation with the furnace shown in the FIGURE will be apparent from the following table.

The fuel saving is apparent.

Since the heater coils in the reformer furnace no longer contain catalyst they are freed from the restrictions of having to serve as a heated container for solids and flowing gases under pressure. They may now be made in any diameter or configuration desired. One preferred form of furnace heating element, for example, would be a number of parallel vertical "hairpins" comprised of tubes of the commonly-used type 304, 24–20 Cr-Ni stainless steel, or similar alloy, in the heating zone of the furnace and attached to headers of the same or similar material, said headers being insulated from or placed outside of the heating zone of the furnace to reduce their metal temperature. For example, 2 inch OD tubing (25–20 Cr-Ni) with ¼ inch wall will have adequate structural integrity to meet the extreme temperature and internal pressure requirements in the heating zone of the reforming unit shown. Other tube forms, sizes, assemblies and materials may, of course, be used in the heating elements without altering the concept of the invention.

The separation of the reactor catalyst mass and of the heat-transfer elements into a plurality of discrete units gives unusual flexibility to the reformer. First, it allows

TABLE

COMPARISON OF DUTIES
(For 1000 Short Tons/Day Ammonia Using Naphtha Feed and Fuel)

| | CASE | |
|---|---|---|
| Type of Drive Turbines: | A | B |
| 1. Secondary Air Compressor (10,130 BHP) | Steam | Combustion |
| 2. Other major pumps and Compressors | Steam | Steam |
| Naphtha Consumption (lbs/hr): | | |
| 1. Feed | 43,685 | 43,685 |
| 2. Fuel | 26,375 | 21,975 |
| 3. Total | 70,060 | 65,660 |
| Reformer Furnace Duties ($10^6$ Btu/hr): | | |
| 1. Primary Reforming | | |
| A. In radiant section | 245.0 | 174. |
| B. In convection section | 0 | 71. |
| C. Total | 245.0 | 245. |
| 2. Process Steam Superheating | 24 | 24 |
| 3. Secondary Air Preheating | 19 | 19 |
| 4. Total Reforming Reaction | 288 | 288 |
| 5. To Auxiliary Consumers | 253 | 72 |
| 6. TOTAL Furnace Duty | 541 | 360 |
| Steam Quantities (lbs/hr): | | |
| 1. High Pressure Steam Generated | 452,000 | 366,000 |
| 2. Exhaust Steam Condensed | 196,000 | 124,000 |
| Total Plant Cooling Water gal/min | 39,300 | 32,000 | greater freedom in varying the catalyst formulation as regards both particle size and shape, and chemical composition. For example, in the reforming of light hydrocarbons such as naphtha, as typified by equation (2), it is postulated that the first action is pyrolysis or hydrocracking of the naphtha, followed by chemical reaction with steam. The last survivor of the cracking of the feedstock is held to be the most refractory hydrocarbon, methane. The catalyst employed in the initial reactor (to which is sent the preheated steam-hydrocarbon feed mixture) can be a catalyst tailored for effectively rupturing carbon-to-carbon bonds without laying down deposits of troublesome coke or carbon. Catalyst used in subsequent beds can be specifically formulated to aid the reforming reaction. Catalyst composition may also be graduated, if desired, to match the change in composition of the process gas as it flows from stage to stage in the process. The benefits from so varying the catalyst formulation from stage to stage include maximizing the activity and life of the catalysts (thus lowering their initial installation and replacement costs) as well as improved process performance by more nearly attaining equilibrium gas composition (lower methane "leak") at a given gas outlet temperature relative to a catalyst whose composition is a compromise for the average gas composition in the conventional reformer tubes.

Secondly, the flexibility in the utilization of heat in the present process reforming furnace leads to the possibility of significant fuel savings and further reduction in furnace costs. In the conventional reformer, the reforming reaction cannot be conveniently carried out other than entirely in the radiant section of the furnace. As noted before, the entire conventional reformer tube sees the burner flames and the products of combustion leave the radiant section at temperatures above 1900°F after supplying the heat required to perform the reforming reaction. Cooling these flue gases to 500°F or less for the sake of economical heat utilization before venting them to the atmosphere will result in the availability of a quantity of heat of about the same magnitude as that used to conduct the reforming reaction. The minimum fired duty for the conventional reformer furnace is then about double that required to satisfy the reforming reaction. Economy of operation thus requires that means must be found for utilization elsewhere in the process or plant of at least one-half of the fired duty of this conventional reformer furnace.

In the scheme depicted in the FIGURE, however, it is possible to locate the lower temperature reheat coils, e.g. coil 18, in the convection section 3 of the furnace 1 rather than placing all the reheat coils in the radiantly heated furnace section 2. A closer approach to true counter-currency may then be achieved between the combustion gases and the vapors being reformed. The minimum fuel consumption of the furnace is no longer dictated by the total heat requirements of the reforming reaction supplied as radiant heat and can be considerably less than for the conventional reforming furnace.

I claim:

1. Apparatus for generating a synthesis gas from a hydrocarbon feed comprising
    A. plural primary adiabatic reactors including an initial primary reactor, at least one intermediate primary reactor and a final primary reactor in series flow connection,
    B. means heating the hydrocarbon feed to the reactors including
        b-1. a longitudinally extended furnace having a firebox at one end defining a higher temperature radiant heating section, and a lower temperature convection heating section beyond the firebox, said reactors being located outside the furnace, and
        b-2 plural heaters flow connected with said reactors in alternating relation including a first heater in the convection heating section of the furnace for said initial primary reactor, a second heater for the intermediate primary reactor in the convection heating section of the furnace between the radiant heating section of the furnace and said first heater and a heater in the radiant heating section of the furnace for the final primary reactor arranged to pass the hydrocarbon feed progressively from the lower temperature convection heating section to the higher temperature radiant heating section of the furnace and in sequence alternately through said heaters within the furnace and their reactors outside the furnace to produce a primary reactor effluent;
    C. secondary reactor means comprising a secondary reactor in which compressed air is reacted with the primary reactor effluent;
    D. combustion turbine means arranged to exhaust oxygen-containing combustion gases into said furnace for combustion with fuel.
    E. a centrifugal air compressor coupled to the output shaft of the combustion turbine means arranged to supply compressed air to the secondary reactor, and
    F. air heating means within the convection section of the furnace to heat the compressed air being passed to the secondary reactor.

* * * * *